Feb. 15, 1966  J. J. MOORE  3,235,719
ELECTRICAL SIGNAL MODIFYING CIRCUITS
Filed Dec. 15, 1959  2 Sheets-Sheet 1

INVENTOR.
JAMES J. MOORE
BY
John F. Hohmann
ATTORNEY

United States Patent Office 3,235,719
Patented Feb. 15, 1966

3,235,719
ELECTRICAL SIGNAL MODIFYING CIRCUITS
James J. Moore, Austin, Tex., assignor to Union Carbide Corporation, a corporation of New York
Filed Dec. 15, 1959, Ser. No. 859,779
10 Claims. (Cl. 235—197)

This invention relates to electrical signal modifying circuits and refers more particularly to circuits for producing a current output which is a function of a voltage input.

For some purposes it is desired to modify an electrical signal reecived from one source to produce an output signal which is not only different in character but also different in magnitude from the input signal. One device, for example, which depends in part on such a signal modification is a "noise exposure meter" which gives an indication of the acoustic energy to which an individual or article is subjected in a period of time. Thus, a voltage produced by a microphone, which voltage is proportional to sound pressure, is required to be modified to produce a signal to an integrator which is proportional to the square of the sound pressure. This is so because sound intensity is proportional to the square of sound pressure, and acoustic energy is proportional to the integral of sound intensity. When the signal produced by the microphone is thus modified and integrated, a measure of acoustic energy is obtained. The "integrator" referred to is preferably of the "solion" type as will be explained below.

For such a device as a noise exposure meter, it is also necessary that an alternating current signal be rectified and, furthermore, that no current be supplied to the integrator except when a signal is received at the microphone. Thus, what is needed for this device is a circuit which will perform as an automatic switch, will rectify an alternating current signal, and will produce an output signal proportional to the square of the input signal.

Other devices utilizing solion integrators have somewhat different requirements from those of the noise exposure meter in that they may not require an output signal proportional to the square of the input signal, but in all such devices it is essential that no current be supplied to the integrator in the absence of an input signal. Since in normal operation, a transistor requires a bias voltage, and this results in a current output from the transistor, this current must be counteracted if a transistor is used in a circuit with such an integrator.

It is an important object of the invention to provide a circuit in which an output signal proportional to the square of an input signal is obtained. Another object is such a circuit unaffected by temperature changes. A more specific object is the provision of a circuit, including an integrator and a transistor in which a current produced by a bias voltage on the transistor is prevented from affecting the integrator when no input signal is present.

These objects are achieved by the invention which comprises a circuit in which a biased transistor and a load circuit such as an integrator are employed. By balancing a bias voltage supplied to a transistor and a resistance, the purpose of which is to produce negative feedback, the resistance being connected to the emitter of the transistor, the output signal from the transistor is caused to have the desired relationship to the input signal supplied to it. A reverse current circuit is provided to counteract the current produced by the bias voltage on the transistor and thus to eliminate any effect of such current on the integrator when no input signal is present.

As indicated above, the circuit of the invention may include a device referred to as an integrator. The preferred integrator is of a family of devices recently introduced and referred to generally as "solions." They are discussed in the literature: "Journal of the Electrochemical Society," volume 104, No. 12 (December 1957); "Yale Scientific Magazine," vol. XXXII, No. 5 (February 1958) and "Electronics," volume 32, No. 9 (February 27, 1959) the last-named referring specifically to integrators. A detailed description of a suitable integrator is contained in my joint application with Nelson N. Estes, Serial No. 777,095, filed November 28, 1958, now Patent No. 2,975,374.

Figure 1:
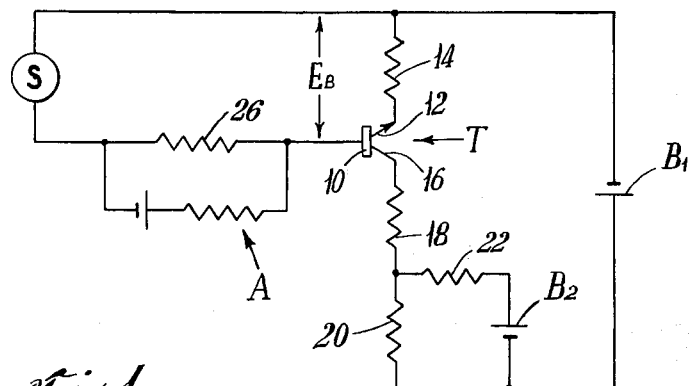
FIG. 1 is a diagram of a circuit embodying the invention.

Referring to FIG. 1 of the drawing, a signal from a source S and a bias voltage $E_B$ derived from a convenient source such as a battery and resistance circuit A, including a resistance 26, are supplied to the base 10 of a transistor T. To the emitter electrode 12 of the transistor T is connected a resistance 14 which in turn is connected to the negative of a battery $B_1$. The resistance 14 determines the response of the circuit due to negative feedback as will be explained below, and the battery $B_1$ furnishes the current for the signal modifying circuit.

To the collector electrode 16 of the transistor T is connected a second resistance 18, the purpose of which is to limit the peak response of the transistor T to an input signal, that is to produce a "saturation" level such that there will be no further increase in output signal despite an increase in input signal. The resistance 18 is also connected to the integrator, shown in FIG. 1 as the load resistance 20 and to a third resistance 22 which in turn is connected to the positive of a battery $B_2$. The opposite side of the load resistance 20 and the negative of the battery $B_2$ are connetced to the positive of the battery $B_1$.

It will be recalled that a bias voltage $E_B$ is supplied to the transistor T in the circuit of FIG. 1. This is necessary to initiate a useful response from the transistor, but this voltage would cause a small constant current to be fed to the integrator whether or not an input signal is being received. It is the function of the battery $B_2$ and resistance 22 to compensate for or counteract this current by supplying to the integrator a reverse current which will exactly balance that current resulting from the bias voltage $E_B$. It is preferred that the resistance 22 have a negative temperature coefficient so that the circuit is useful over a wide temperature range.

Figure 2:
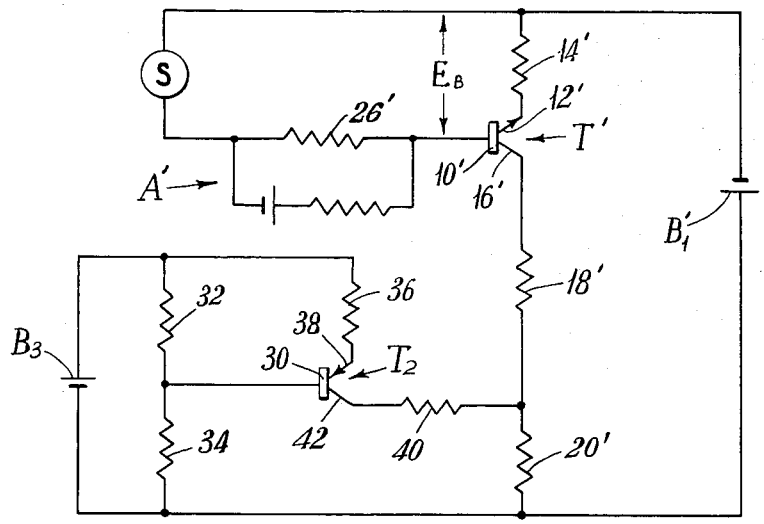
FIG. 2 is a diagram of a modification of the circuit of FIG. 1.

Referring to FIG. 2, another way of counterbalancing the current produced by the bias applied to the transistor T' is there shown. In this case a second transistor $T_2$ is employed, the base 30 of which is connected through resistances 32, 34 to a battery $B_3$. The bias voltage supplied to the transistor $T_2$ is the same as that applied to the transistor T'. A resistance 36 is connected to the positive of the battery $B_3$ and to the emitter 38 of the transistor $T_2$, and a resistance 40 is connected to the collector 42 of the transisor $T_2$ and to a common point between the resistance 18' and the integrator or load resistance 20'. By proper selection of values of components, a current exactly equal to that flowing to the load resistance 20' through that part of the circuit including the transistor T' is caused to flow to the load resistance 20' in that part of the circuit including the transistor $T_2$ and in the opposite direction so that these two currents balance each other out and leave the integrator or load resistance unaffected when there is no input signal. In this case temperature changes have substantially no effect on the circuit, for the two transistors would react in the same way to temperature changes and would continue to balance each other out.

Although either of the reverse current circuits shown in FIGS. 1 and 2 may be employed regardless of the nature of signal output desired from the overall circuit, that of FIG. 1 is most suited for use in a "squaring circuit," that is, one which produces an output signal proportional to the square of an input signal. Such a circuit utilizes the non-linear response of a silicon transistor by operating at below the usual operating point.

Figure 3:
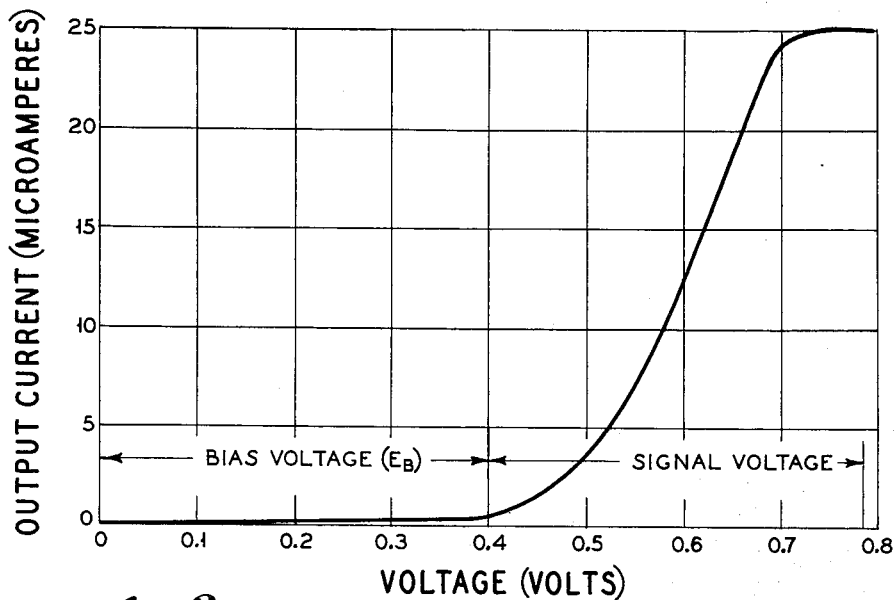
FIG. 3 is a curve representing the relationship between input and output signals produced by the circuit of FIG. 1.

Thus, considering the circuit of FIG. 1 and the curve of FIG. 3, an output signal proportional to the square of the input signal may be attained by supplying a bias voltage of 0.4 volt to the base 10 of the transistor T at room temperature, and by balancing the bias voltage and the resistance 14 connected to the emitter 12 of the transistor T. At this voltage and below, there is negligible current output from the transistor but, as may be seen from FIG. 3, as the voltage increases, that is, as an input signal is provided, the current output increases substantially as the square of the increase, for as the voltage input increases tenfold, the current output increases a hundredfold. This function may be changed to any exponential function wherein the exponent is greater than one, for instance, the cube power or fourth power (within the gain capabilities of the transistor) by changing the value of the resistance 14.

In obtaining the curve of FIG. 3, the circuit illustrated in FIG. 1 was used. The components of the circuit had the following values, the bias voltage ($E_B$) being 0.4 volt:

| | | |
|---|---|---|
| $B_1$ | volts | 1.34 |
| $B_2$ | do | 1.34 |
| Resistance 14 | ohms | 2700 |
| Resistance 18 | do | 22,000 |
| Resistance 22 | megohms | 10 |

The transistor T was a silicon n-p-n type identified as 2N335.

It will be noted from FIG. 3 that the output current of the circuit is negligible when the input voltage is less than 0.4 volt which is the bias voltage applied to the transistor T. If an alternating current voltage is supplied to the circuit, it alternates about the 0.4 volt bias and there will be no output when the voltage is in the negative direction so that the circuit acts as a rectifier and permits integration of one half cycle of an alternating current voltage signal.

It will be noted also that the "knee" or break of the curve of FIG. 3 occurs at a voltage just above 0.4 volt. Since transistors are somewhat sensitive to temperature, this knee shifts with temperature changes. With a silicon transistor, the bias voltage should be 0.4 volt when the circuit is operated at about 75° F. At 30° F. the bias voltage should be about 0.5 volt, and at about 110° F. the bias voltage should be about 0.3 volt. This bias voltage may be made to change with temperature in this manner by using for the resistance 26 in the battery-resistance circuit A a negative temperature coefficient resistor. As above indicated, to compensate for temperature changes in the reverse current portion of the circuit of FIG. 1, the resistance 22 should have a negative temperature coefficient.

Figure 4:
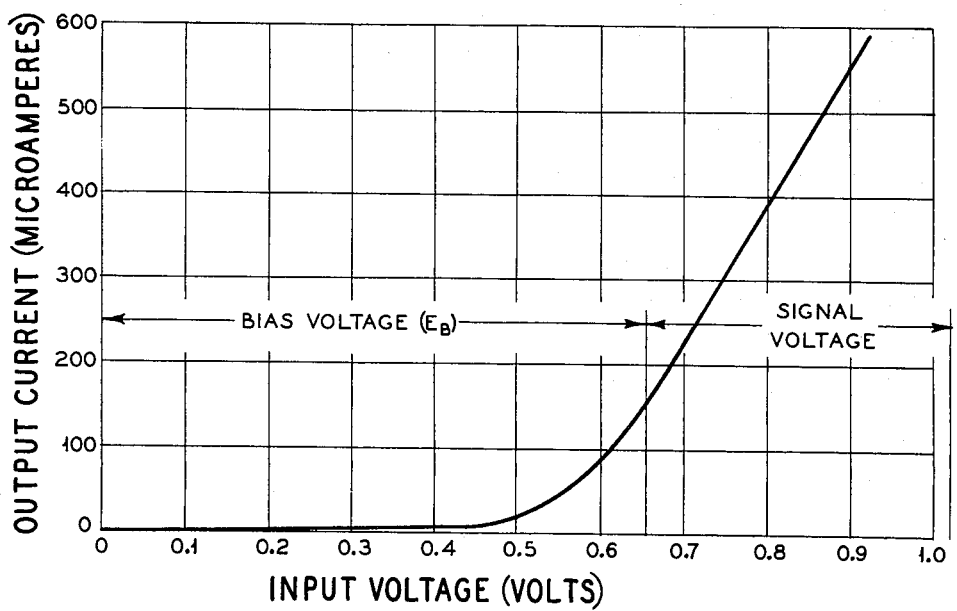
FIG. 4 is a similar curve representing the relationship obtained between input and output signals by the circuit of FIG. 2.

When a transistor is supplied with a bias voltage at its normal operating point or above, and the voltage is increased, the output current increases linearly as shown by FIG. 4, a curve obtained by supplying increasing voltages to the circuit of FIG. 2. When the bias voltage is greater than 0.4 volt, for example, is 0.65 volt as indicated, the circuit is suitable for producing an output current which is a linear function of the input voltage, that is, operating above the knee of the curve on its linear portion. To do this, the bias on the transistor $T_2$ (FIG. 2) is adjusted until the net current in the integrator 20' is zero. Then when a pulsating direct current signal is applied such that the signal increases the voltage above this bias point, a current will flow in the integrator. If it is desired to integrate both positive and negative signals, the input signal may be applied to both transistors T' and $T_2$. Thus, alternate transistors will furnish current to the integrator depending on the polarity of the input signal. Because the circuit includes two transistors which in effect are opposed to each other, temperature effects are not important.

In obtaining the curve of FIG. 4 utilizing the circuit of FIG. 2 the components of the circuit had the following values, the bias voltage ($E_B$) being 0.65 volt:

| | | |
|---|---|---|
| $B'_1$ | volts | 1.5 |
| $B_3$ | do | 1.5 |
| Resistance 14' | ohms | 470 |
| Resistance 36 | do | 470 |
| Resistance 32 | do | 5600 |
| Resistance 34 | do | 4700 |

The transistor T' was a silicon n-p-n type 2N335. The second transistor, $T_2$, was a p-n-p type 2N328A. Since there was no desire to limit the response of the transistors to increasing voltage, the resistances 18' and 40 had zero values.

In the circuits of the invention the polarities of the transistors used in a specific location are unimportant. Thus, when a n-p-n type is shown, a p-n-p type may be used and vice versa, provided the polarity of the batteries is reversed. In the circuit of FIG. 2 it is necessary that the two transistors be opposite types. Although it is preferred that silicon transistors be used, other kinds, such as germanium may be satisfactory. In general, germanium transistors require the use of a lower bias voltage than do silicon transistors for the same response.

I claim:

1. A circuit for producing an output electrical signal which is proportional to an exponential function of the change of an input electrical signal wherein the exponent is greater than one comprising a transistor to which said input signal is supplied, bias means whereby said transistor is biased in the range wherein the response of said transistor to an input signal is nonlinear, a resistance connected to the emitter of said transistor, said resistance being so balanced with respect to said bias means as to modify said output signal so that it varies exponentially with the change of said input signal, and a load circuit connected to at least one electrode of said transistor.

2. A circuit as defined in claim 1 wherein said resistance is so balanced with respect to said biased voltage as to cause said output signal current to vary substantially as the square of said input signal voltage.

3. A circuit as defined in claim 1 which includes means for counteracting that portion of the output signal from said transistor in said load circuit which is due to said bias voltage.

4. A circuit as defined in claim 3 wherein said means includes a battery and a series resistance connected in parallel with said load circuit and so balanced with respect to said bias voltage as to supply to said load circuit a current equal and opposite to that supplied thereto by said transistor in response to said bias voltage.

5. A circuit as defined in claim 4 wherein said resistance has a negative temperature coefficient.

6. A circuit as defined in claim 3 wherein said means includes a second independently connected transistor of opposite polarity to said first transistor, said second transistor having a second bias means connected thereto whereby said second transistor produces an output current equal and opposite to that produced from said first transistor as a result of the bias voltage supplied to said first transistor.

7. A circuit for modifying an electrical signal which circuit comprises a transistor to which an input signal is supplied, bias means whereby said transistor is biased, a load circuit to which a signal response from said transistor is supplied and from which an output signal is obtained, and means for counteracting a signal supplied to said load circuit as a result of the bias voltage on said transistor, whereby said output signal from said load circuit is responsive only to said input signal to said transistor.

8. A circuit as defined in claim 7 in which said means includes a battery and a series resistance connected in parallel with said load circuit and so balanced with respect to the bias voltage supplied to said transistor as to supply to said load circuit a current equal and opposite to that supplied thereto by said transistor in response to said bias voltage.

9. A circuit as defined in claim 8 wherein said resistance has a negative temperature coefficient.

10. A circuit as defined in claim 7 wherein said means includes a second independently connected transistor of opposite polarity to said first transistor, said second transistor having second bias means connected thereto whereby said second transistor produces an output current equal and opposite to that produced from said first transistor as a result of said bias voltage supplied to said first transistor.

References Cited by the Examiner

UNITED STATES PATENTS

| | | | |
|---|---|---|---|
| 2,802,067 | 8/1957 | Zawels | 307—88.5 |
| 2,808,471 | 10/1957 | Poucel et al. | 307—88.5 |
| 2,816,964 | 12/1957 | Giacoletto | 330—25 |
| 2,854,577 | 9/1958 | Torode | 235—183 |
| 2,885,494 | 5/1959 | Darlington et al. | 330—23 X |
| 2,915,600 | 12/1959 | Starke | 330—24 X |
| 2,949,543 | 8/1960 | Nordahl | 307—88.5 |
| 3,109,103 | 10/1963 | Wilhelmsen | 328—142 X |

OTHER REFERENCES

Pages 124–126, May 1948, Korn, "Design of D.C. Electronic Integrators," Electronics.

Pages 637–638, 1951, "Theory and Experiment for a Germanium P–N Junction," F. S. Goucher et al., Physical Review, vol. 81, No. 4.

Pages 19 and 20, December 1954, Hamer, "A Stabilized Driftless Analog Integrator," Transactions of the IRE on Electronic Computers, vol. EC–3, No. 4.

MALCOLM A. MORRISON, *Primary Examiner.*

LEO SMILOW, DARYL W. COOK, *Examiners.*